(12) United States Patent
Gao et al.

(10) Patent No.: US 7,769,354 B2
(45) Date of Patent: Aug. 3, 2010

(54) MOBILE DEVICE HOUSING WITH A DISPLAY UNIT, AND METHOD FOR MAKING THE MOBILE DEVICE HOUSING

(75) Inventors: Jin-Feng Gao, Shenzhen (CN); Che-Yuan Hsu, Taipei Hsien (TW); Ken-Holm Hansen, Faarevejle (DK)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 647 days.

(21) Appl. No.: 11/752,904

(22) Filed: May 23, 2007

(65) Prior Publication Data

US 2008/0117576 A1    May 22, 2008

(30) Foreign Application Priority Data

Nov. 22, 2006    (CN)    ......................... 2006 1 0156991

(51) Int. Cl.
*H04B 1/38* (2006.01)
*H04K 3/00* (2006.01)

(52) U.S. Cl. .................. 455/90.3; 455/575.1; 174/521; 264/219; 264/272.11; 349/58; 349/60

(58) Field of Classification Search ................ 455/90.3, 455/575.1, 575.8; 174/520–521; 264/219, 264/225–226, 272.11; 349/58, 60
See application file for complete search history.

(56) References Cited

U.S. PATENT DOCUMENTS

| | | | |
|---|---|---|---|
| 6,255,587 B1 * | 7/2001 | Lambert et al. | 174/541 |
| 2006/0054484 A1 * | 3/2006 | Uleski et al. | 200/341 |
| 2008/0239636 A1 * | 10/2008 | Hsu et al. | 361/681 |

FOREIGN PATENT DOCUMENTS

| | | |
|---|---|---|
| CN | 1569475 A | 1/2005 |
| WO | 2006095781 A1 | 9/2006 |

* cited by examiner

*Primary Examiner*—Lee Nguyen
(74) *Attorney, Agent, or Firm*—Jeffrey T. Knapp

(57) ABSTRACT

A housing assembly (100), used, e.g., in a mobile device (300), includes a housing body (10) and a display unit (20). The housing body a view opening (110). The display unit is received in the view opening and is configured for providing information and/or graphics. The housing body moldingly receives the view lens therein, via an injection molding process.

15 Claims, 10 Drawing Sheets

MOBILE DEVICE HOUSING WITH A DISPLAY UNIT, AND METHOD FOR MAKING THE MOBILE DEVICE HOUSING

CROSS-REFERENCE TO RELATED APPLICATIONS

This application is related to a co-pending U.S. patent application Ser. No. 11/551,675, entitled "COVER FOR A MOBILE DEVICE", by Chang-Qing Yang et al. That application has the same assignee as the present application, and has been filed on Oct. 20, 2006. This application is also related to another co-pending U.S. patent application Ser. No. 11/690,031, entitled "CAMERA HOUSING WITH A VIEW LENS, METHOD FOR MAKING THE CAMERA HOUSING, AND CAMERA USING THE HOUSING", by Jin-Feng Gao et al. The above-identified applications are incorporated herein by reference.

BACKGROUND OF THE INVENTION

1. Field of the Invention

The present invention relates to mobile device housings and, particularly, to a mobile device housing with a display unit and to a method for making the housing.

2. Description of Related Art

Nowadays, many electronic devices, such as mobile phones, can have any of a variety of display units mounted therein so as to enable them to provide information and/or graphics thereon.

A conventional housing for an electronic device includes a housing portion and a display unit. The housing portion and the display unit are, respectively, manufactured by two separate molding processes. Thus, the display unit is desirably attachable to the housing portion, in order to prevent movement of the display unit during use. Methods for fixing the display unit to the housing portion usually include attachment achieved using adhesive. However, eventually, the display unit of the housing may rather easily become detached from the housing body, as the effectiveness of the adhesive can decrease with time. As a result of even partial detachment, moisture and dust in the ambient air can enter into electronic elements received in the housing, potentially damaging the electronic elements. Of course, complete detachment would create an even greater risk of damage. In some other processes, small bolts are used to fasten the display unit to the housing portion. However, the display unit may be damaged during the attachment of the small bolts. Furthermore, the housing portion and the display unit are made in two separate processes, which thus means that additional time must be spent to properly adhere and/or fasten the display unit to the housing portion.

Therefore, an improved mobile device housing with a display unit is desired in order to overcome the above-described shortcomings.

SUMMARY OF THE INVENTION

In one embodiment thereof, a housing configured (i.e., structured and arranged) for enclosing a mobile device is provided. The housing includes a housing body and a display unit. The housing body defines a view opening. The display unit is received in the view opening and is configured for providing information and/or graphics. The housing body is moldingly attached to the display unit.

Other advantages and novel features will become more apparent from the following detailed description of preferred embodiments when taken in conjunction with the accompanying drawings.

BRIEF DESCRIPTION OF THE DRAWINGS

Many aspects of the mobile device housing with a display unit can be better understood with reference to the following drawing. The components in the drawing are not necessarily drawn to scale, the emphasis instead being placed upon clearly illustrating the principles of the mobile device housing with a display unit. Moreover, in the drawing like reference numerals designate corresponding parts throughout the several views.

DETAILED DESCRIPTION OF THE INVENTION

Figure 1:
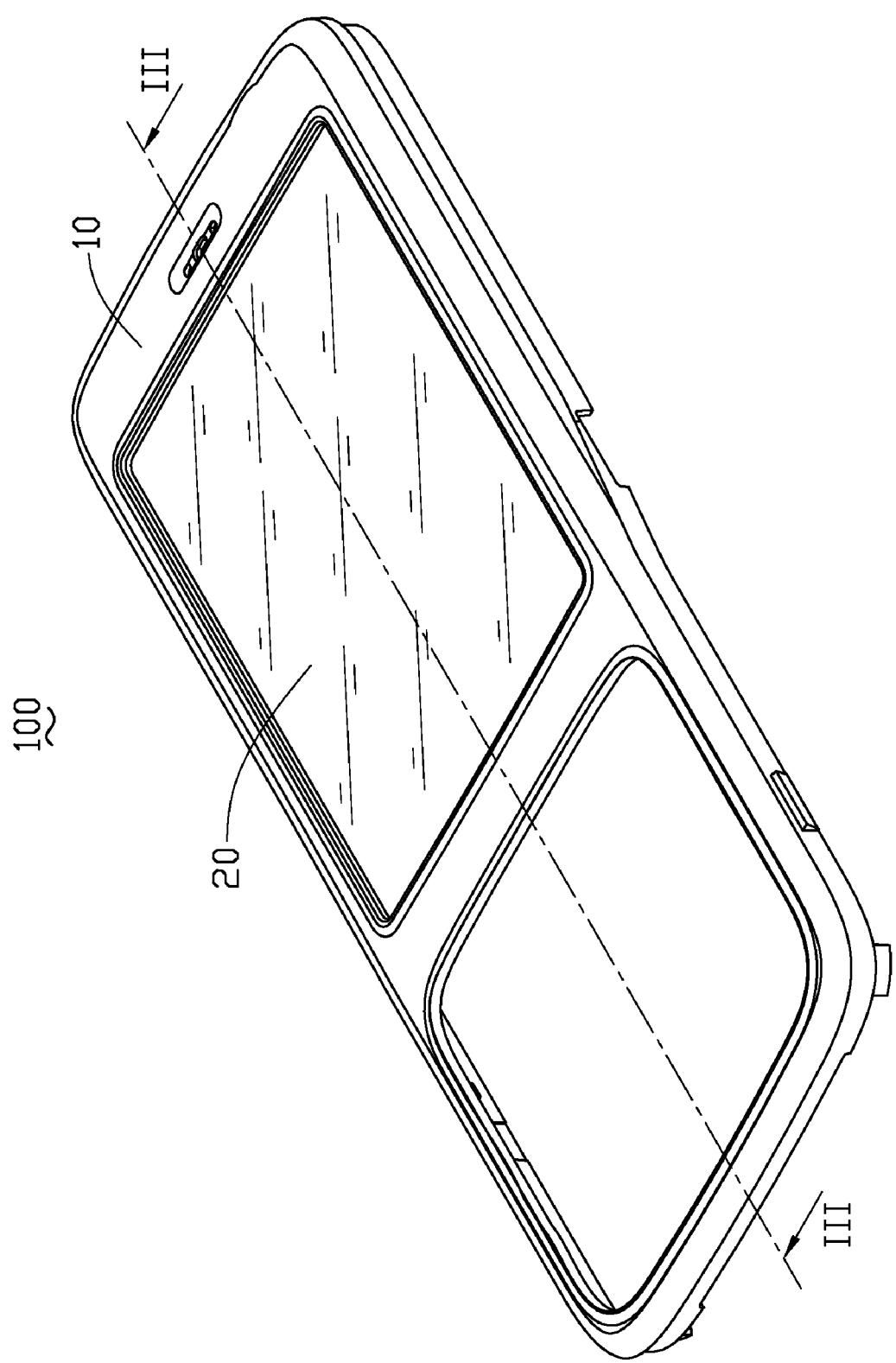
FIG. 1 is a perspective view of a preferred embodiment of a housing for a mobile device.

Referring to FIG. 1, in a preferred embodiment, a housing assembly 100 for a mobile device (not shown in FIG. 1), e.g. a mobile phone, PDA, or digital camera, includes, at least, a housing body 10 and a display unit 20. The display unit 20 is received in the housing body 10.

Figure 2:
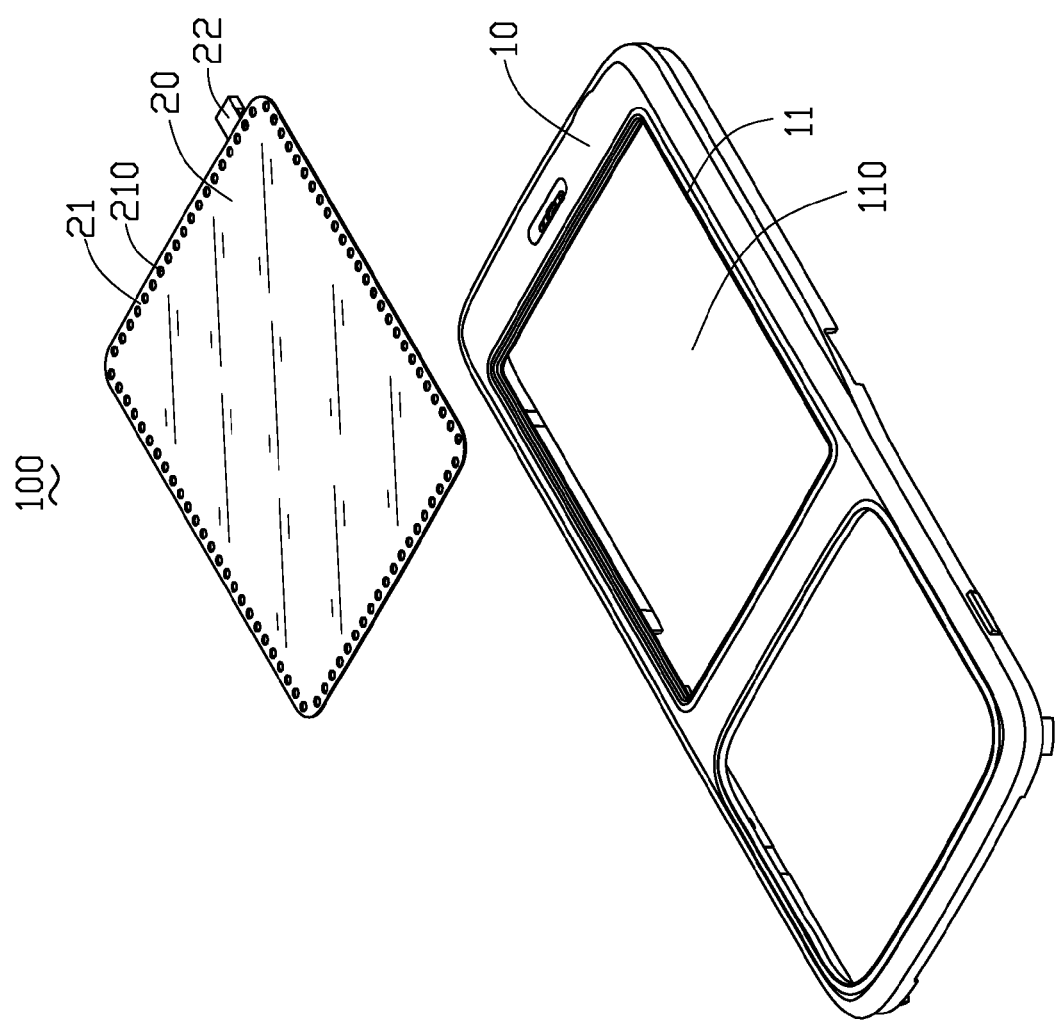
FIG. 2 is an exploded view of the housing, as shown in FIG. 1.

Referring to FIG. 2, the housing body 10 is preferably made of a plastic material. The plastic material can, e.g., be chosen from the group including polyvinyl chloride, polyethylene terephthalate, acrylonitrile-butadiene-styrene, polycarbonate, polyimide, liquid crystal polymer, polyetherimide, polyphenylene sulfide, polysulfone, polystyrene, glycol-modified polyester, polypropylene, and any desired combination thereof. The housing body 10 has an inner rim portion 11, defining a view opening 110 configured for receiving the display unit 20.

The display unit 20 may, beneficially, be an organic light-emitting display or a liquid crystal display. The display unit 20 has an outer rim portion 21, projecting from a flange thereof. The outer rim portion 21 has a plurality of through holes 210 formed therein. The display unit 20 has an electric connector 21 formed on one portion of the flange thereof and configured for electrically connecting the display unit with, e.g., a printed circuit board or any of other electronic elements (none shown) received in the housing 100.

Figure 3:
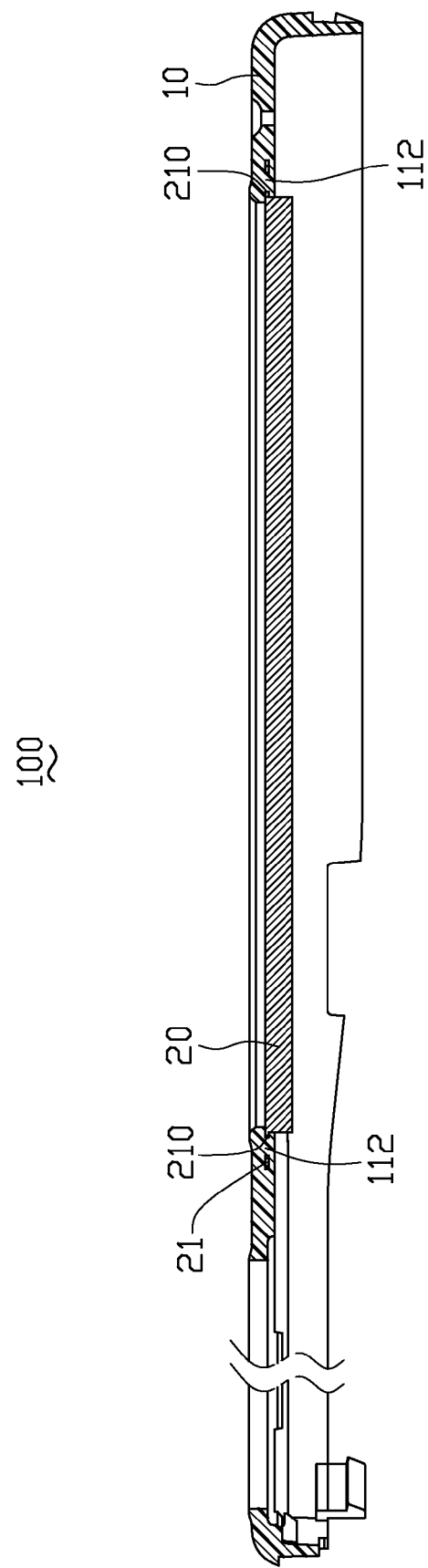
FIG. 3 is a cross-sectional view of the housing, taken along line III-III in FIG. 1.

Referring to FIG. 3, the housing body 10 is, advantageously, moldingly attached onto (i.e., co-molded with) the display unit 20, with the display unit 20 being received into the view opening 110 of the housing body 10. The molding insures that the outer rim portion 21 of the display unit 20 is inserted into (i.e., fittingly received within) the inner rim portion 11 of the housing body 10, with at least one injection body 112 of the inner rim portion 11 being engaged in a respective through hole 210 of the outer rim portion 21. Thus, an interference fit between the display unit 20 and the view opening 11 of the housing body 10 is achieved, providing an airtight and dustproof fit for the housing assembly 100. Furthermore, the at least one injection body 112 formed during molding and extending through a corresponding through hole 210 respectively acts as a molded through-pin, helping to ensure and maintain the alignment of the display unit 20 relative to the housing body 10. It is to be understood that the compatibility of the materials used for the housing body 10 and the display unit 20 could effectively create/yield a plastic weld between such elements, as well.

Figure 4:
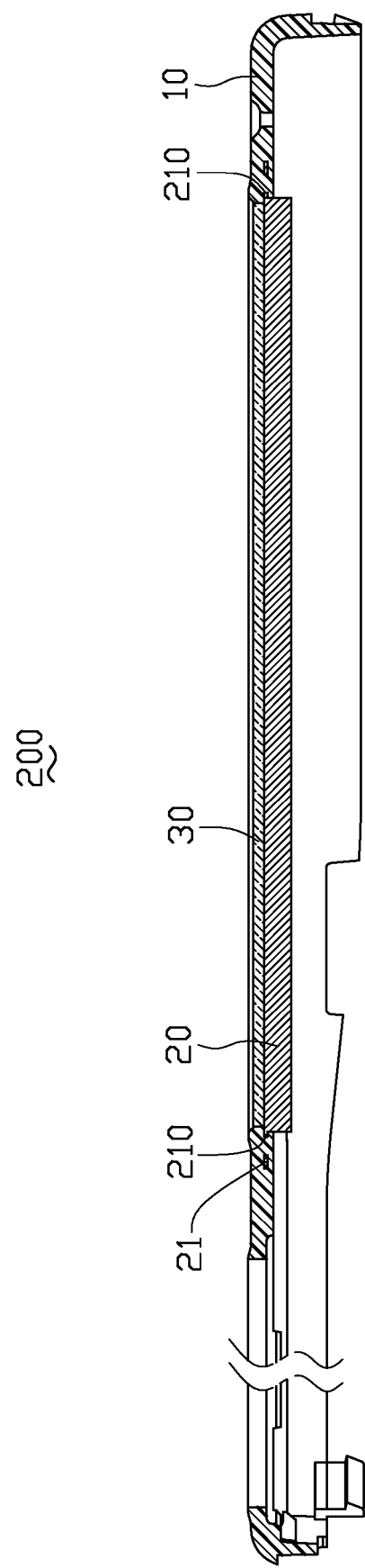
FIG. 4 is a cross-sectional view of another embodiment of a housing for a mobile device.

Referring to FIG. 4, in another preferred embodiment, a housing assembly 200, similar to the housing assembly 100, may further include a view lens 30. The view lens 30 is also received in the view opening 11 and covers the display unit 20 so as to protect the display unit 20 from being scratched. It is to be understood that such a view lens 30 may additionally be designed to improve one or more optical properties (e.g., glare-reduction, color and/or UV filtering, view magnification, etc.). The housing body 10 is, advantageously, moldingly attached to the display unit 20 and the view lens 30. Of course, either alternatively or additionally, the view lens 30 can also be fixed to the housing body 10 via an adhesive.

Figure 5:
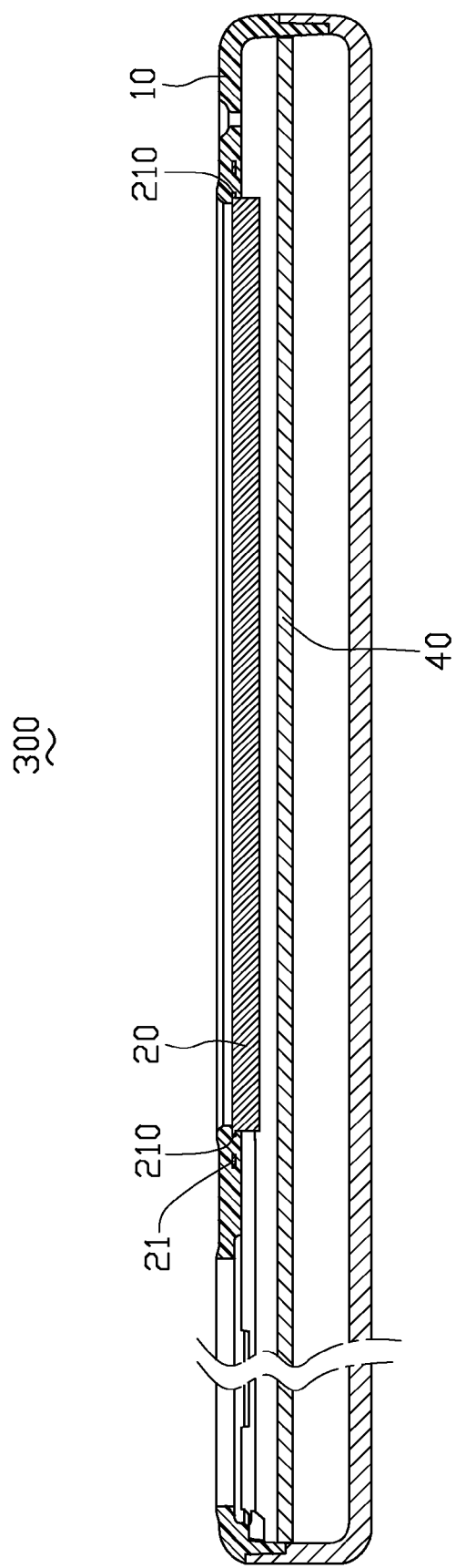
FIG. 5 is a cross-sectional view of an electric device using the housing as shown in FIG. 1, shown in phantom to schematically indicate the electric device in its fully assembled state.

Referring to FIG. 5, the housing assembly 100 can be used in an electronic device (e.g., a mobile phone, digital camera, or PDA) 300, with a printed circuit board 40 received therein. The electric connector 21 of the display unit 20 is electrically connected to the printed circuit board 40, so as to enable the display unit 20 to provide information or graphics thereon.

An exemplary method for making the housing assembly 100 is provided. Firstly, the display unit 20 is provided. The display unit 20 can, advantageously, be any organic light-emitting display or liquid crystal display.

Figure 6:
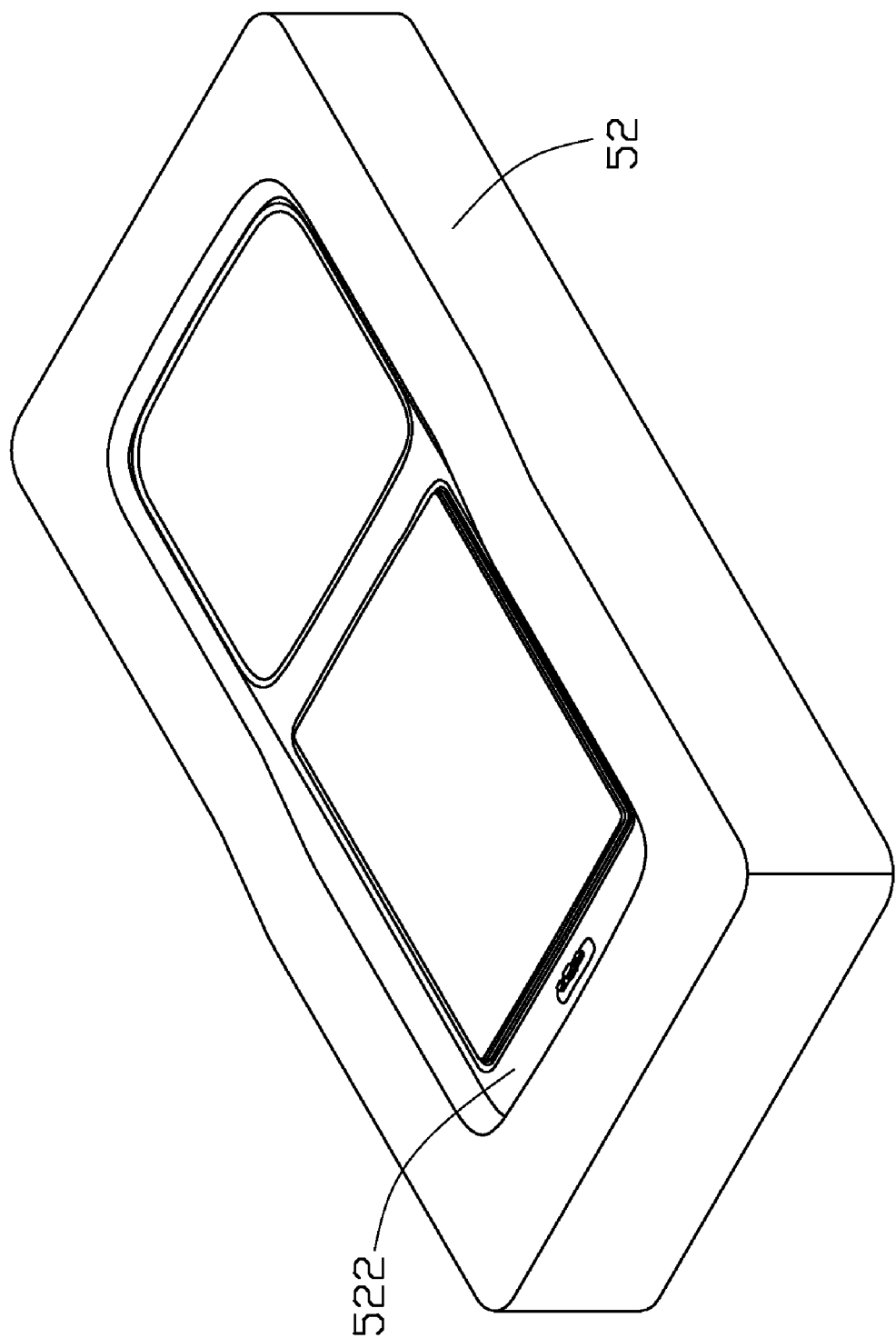
FIG. 6 is a schematic view of a female mold of an injection mold for making the housing in FIG. 1.
Figure 7:
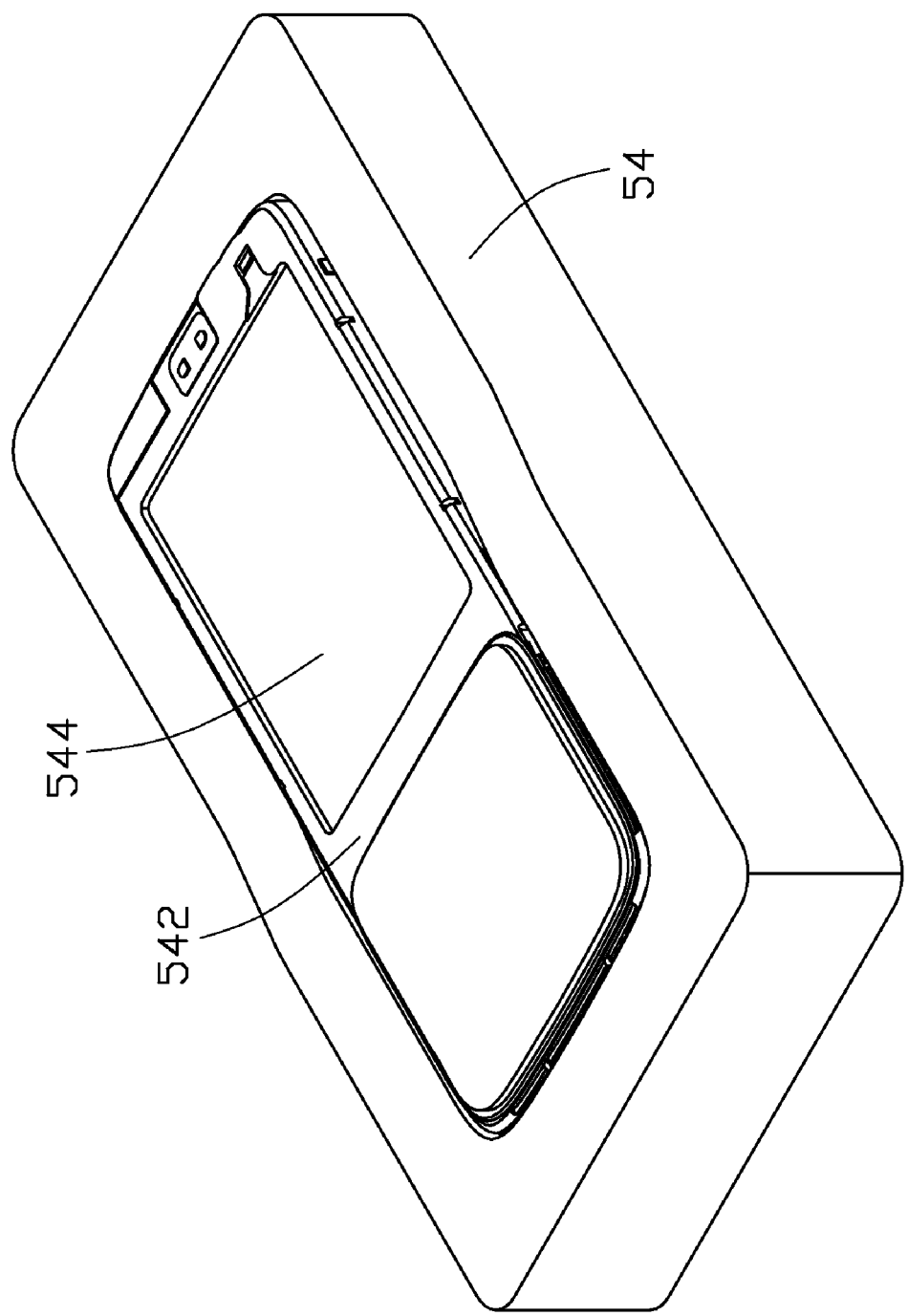
FIG. 7 is a schematic view of a male mold of the injection mold for making the housing in FIG. 1.
Figure 8:
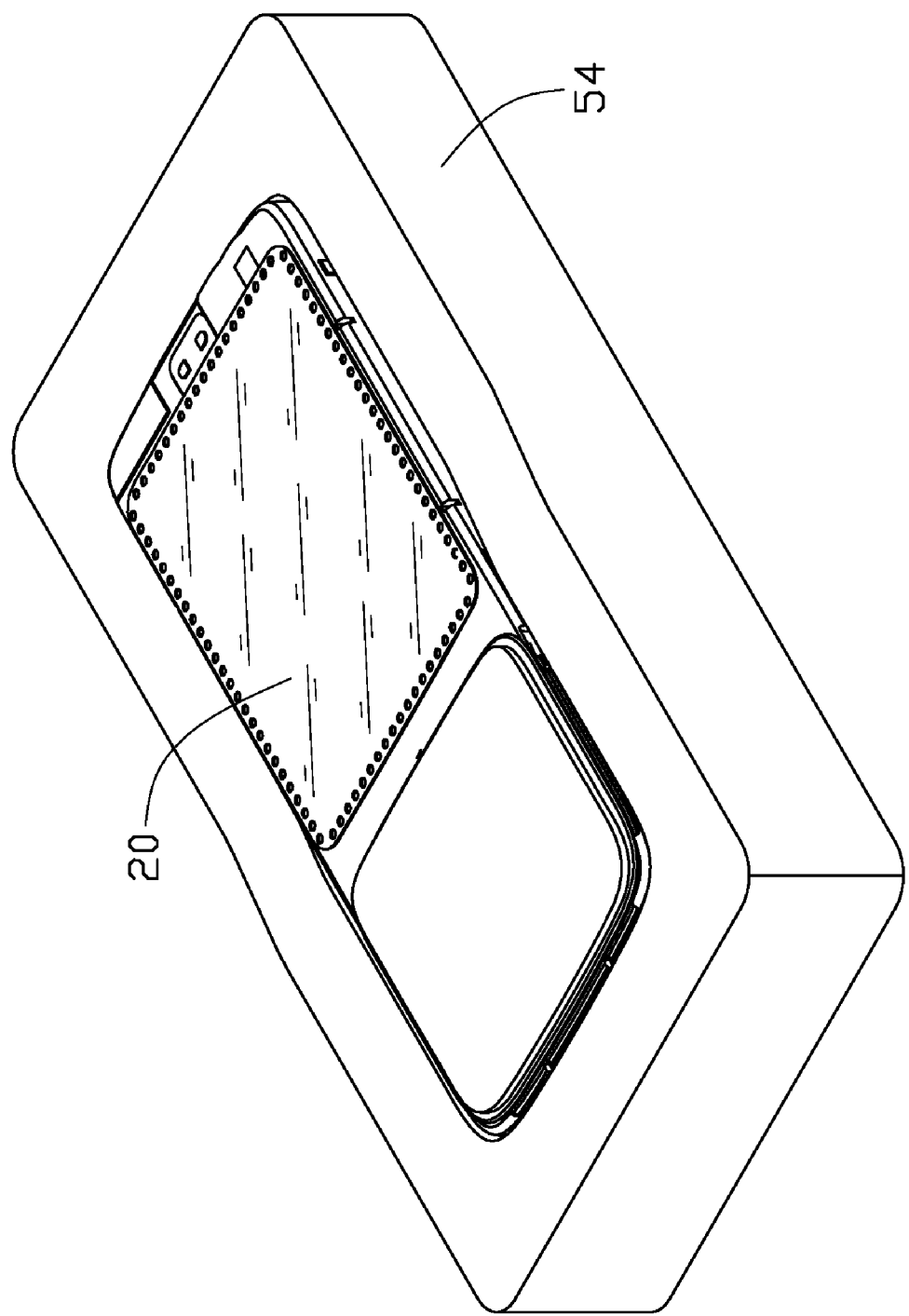
FIG. 8 is a schematic view of the male mold in FIG. 7, with a display unit being fixed therein.

Secondly, an injection mold is provided. Referring to FIG. 6 and FIG. 7, the injection mold includes a female mold 52 and a male mold 54. The female mold 52 has a recessed portion 522 formed therein. The male mold 54 has a mold core 542 mounted thereon. The mold core 542 has a receiving groove 544 formed therein and configured for partially receiving the display unit 20. The male mold 54 is matingly engageable with the female mold 52.

Thirdly, a bottom portion of the display unit 20 is fixed into the receiving groove 544 of the molding core 542, with a top portion of the display unit 20 projecting out of the molding core 542.

Figure 9:
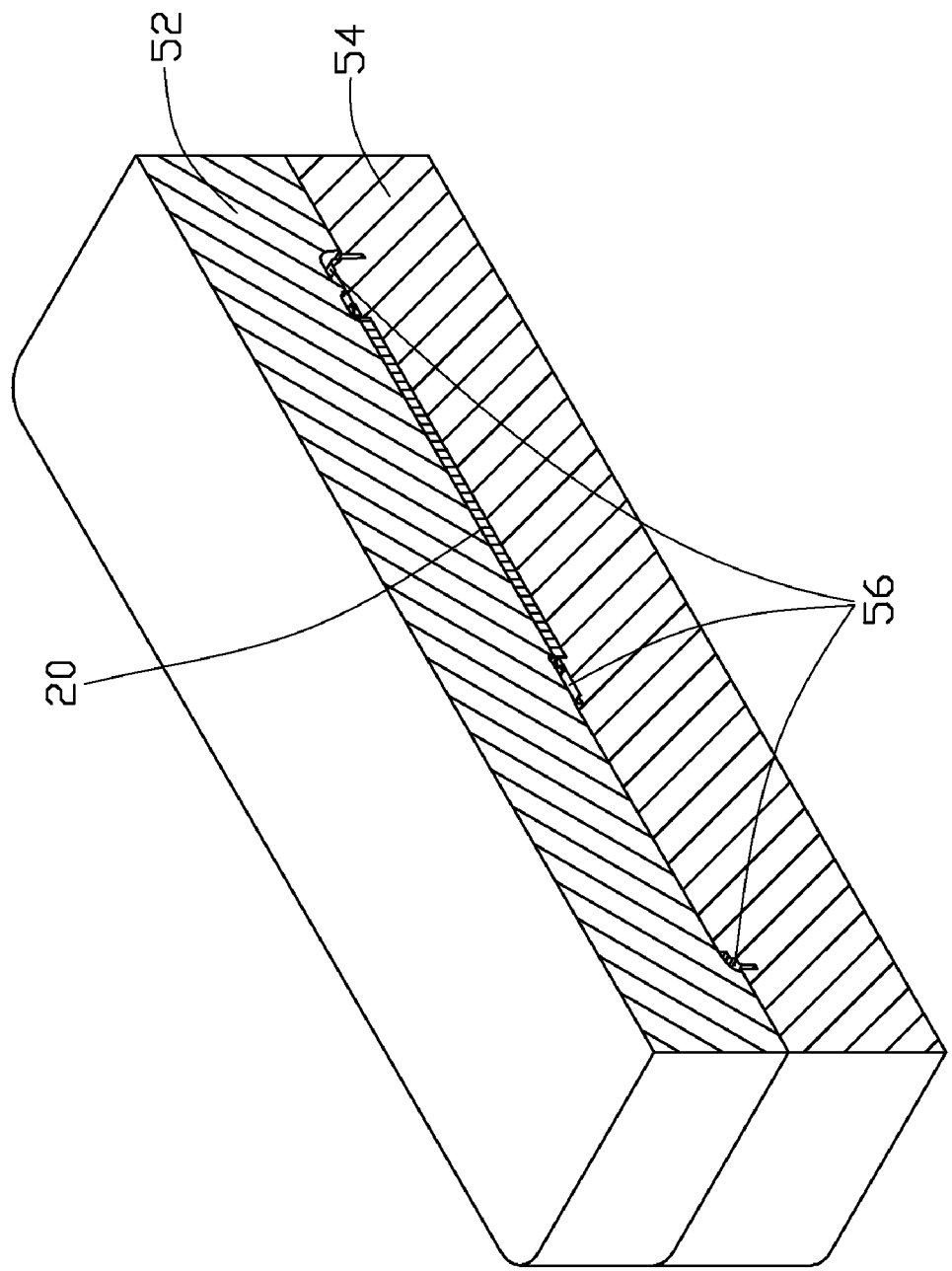
FIG. 9 is a schematic view of the female mold in FIG. 6 and the male mold in FIG. 7, being used together, showing a closed state.
Figure 10:
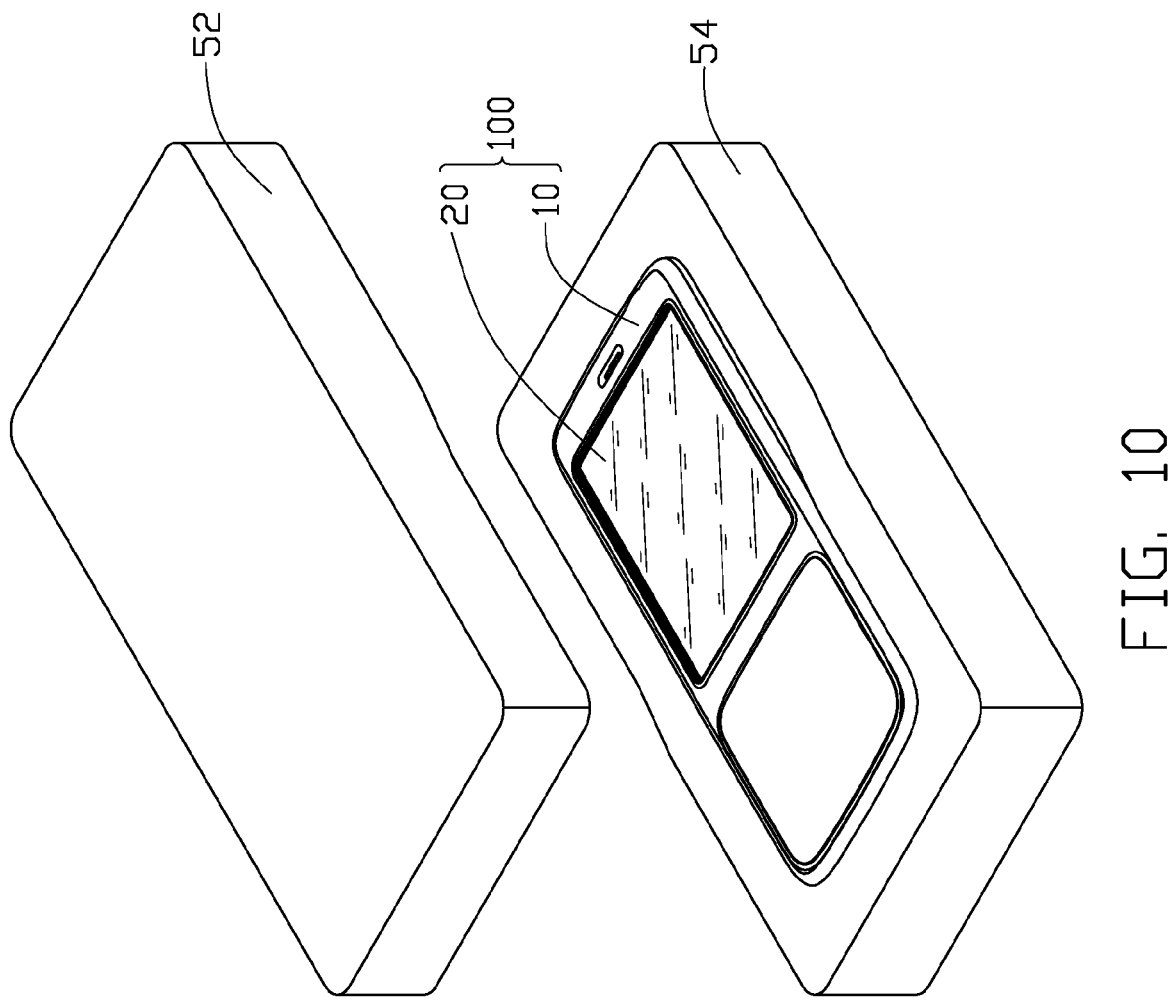
FIG. 10 is a schematic view of the injection mold of FIG. 9, with the housing molded therein.

Fourthly, referring to FIG. 9, the injection mold 50 is closed by engaging the male mold 54 with the female mold 52, and thus a molding cavity 56 is defined. Fifthly, molten plastic is injected into the molding cavity 56. Thus, the housing body 10 is moldingly attached to (i.e., fittingly formed around) the display unit 20 in the molding cavity 56 by injection molding, with at least one injection body 112 being concurrently formed during molding and extending through a corresponding through hole 210. Such injection bodies 112 help hold the display unit 20 in place relative to the housing body 10. The housing body 10 is preferably made of a plastic material, as described above.

Finally, the injection mold is cooled. The housing assembly 100, including the housing body 10 and the display unit 20, is obtained.

It should be understood that the display unit 20 could be fixed to the housing body 10 by injection molding, effectively creating an interference fit and, most likely, a plastic weld therebetween. Thus, in the process of making the housing assembly 100, there is no need to further fix the display unit 20 to the housing body 10, using an additional adhesive or small bolts. The display unit 20 and the housing body 10 can be joined together with no gap and with a concordant seal. As such, the cover can obtain a highly airtight, water-resistant, and dustproof seal.

It should be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A housing for a mobile device comprising:
   a housing body defining a view opening therein; and
   a display unit moldingly received in the housing body within the view opening
   wherein the display unit has a flange and an outer rim portion projecting from the flange, the outer rim portion having a plurality of through holes formed therein, the outer rim portion of the display unit being received within an inner rim portion of the housing body, with at least one injection body of the inner rim portion being engaged in a respective through hole of the outer rim portion.

2. The housing as claimed in claim 1, wherein the housing body is made of a plastic material.

3. The housing as claimed in claim 1, wherein the display unit is an organic light-emitting display unit or a liquid crystal display unit.

4. The housing as claimed in claim 1, wherein the display unit has an electric connector formed on one end thereof.

5. The housing as claimed in claim 1, further including a view lens received in view opening, the view lens being configured for protecting the display unit.

6. The housing as claimed in claim 5, wherein the view lens covers the display unit, the housing body moldingly receiving the view lens.

7. The housing as claimed in claim 5, wherein the view lens covers the display unit and is fixed to the housing body via an additional adhesive.

8. A mobile electronic device, comprising:
   a printed circuit board; and
   a housing receiving the printed circuit board, the housing comprising:
      a housing body carrying printed circuit board, the housing body further defining a view opening; and
      a display unit received in the view opening, the display unit being electrically connected to the printed circuit board so as to enable the display unit to provide graphical information, the housing body moldingly receiving the display unit therein
   wherein the display unit has a flange and an outer rim portion projecting from the flange, the outer rim portion having a plurality of through holes formed therein, the outer rim portion of the display unit being received within an inner rim portion of the housing body, with at least one injection body of the inner rim portion being engaged in a respective through hole of the outer rim portion.

9. The mobile electronic device as claimed in claim 8, wherein the housing body is made of a plastic material.

10. The mobile electronic device as claimed in claim 8, wherein the display unit is an organic light-emitting display unit or a liquid crystal display unit.

11. The mobile electronic device as claimed in claim 8, wherein the display unit has an electric connector formed on one end thereof, the electric connector being electrically connected to the printed circuit board.

12. The mobile electronic device as claimed in claim 8, wherein the housing further includes a view lens received in view opening, the view lens being configured for protecting the display unit.

13. The mobile electronic device as claimed in claim 12, wherein the view lens covers the display unit, the housing body moldingly receiving the view lens.

14. The mobile electronic device as claimed in claim 12, wherein the view lens covers the display unit and is fixed to the housing body via an additional adhesive.

15. A method for making a housing assembly, comprising the steps of:
  providing a display unit;
  inserting the display unit into a mold, with a mold cavity defined in the mold; and
  injecting a molten plastic into the mold cavity to form a housing body, with the housing body resultantly being moldingly attached to the display unit
  wherein the display unit has a flange and an outer rim portion projecting from the flange, the outer rim portion having a plurality of through holes formed therein, at least one injection body of the housing body being concurrently formed during molding and extending through a respective one of the through holes.

* * * * *